(12) United States Patent
Wittkopf et al.

(10) Patent No.: US 10,460,485 B2
(45) Date of Patent: Oct. 29, 2019

(54) MULTI-DIMENSIONAL DATA VISUALIZATION

(71) Applicant: SAP SE, Walldorf (DE)

(72) Inventors: Malin Wittkopf, Heidelberg (DE);
Anca Maria Florescu, Wiesloch (DE);
Christina Hall, Dielheim (DE);
Tatjana Borovikov, Pfungstadt Hahn (DE); Guido Wagner, Rauenberg (DE);
Klaus Herter, Leimen (DE); Felix Harling, Bad Schönborn (DE);
Christian Knirsch, Kronau (DE);
Christian Grail, Zuzenhausen (DE);
Bogdan Alexander, Heidelberg (DE);
Joachim Fiess, Karlsruhe (DE);
Hergen Siefken, Plankstadt (DE); Hee Tatt Ooi, Karlsruhe (DE);
Hans-Juergen Richstein, Rauenberg (DE); Marita Kruempelmann, Dielheim (DE); Ingo Rues, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/459,809

(22) Filed: Mar. 15, 2017

(65) Prior Publication Data
US 2018/0268578 A1    Sep. 20, 2018

(51) Int. Cl.
*G06T 11/20* (2006.01)
*G06T 15/00* (2011.01)
*G06F 17/30* (2006.01)
*G06F 16/904* (2019.01)
*G06T 19/00* (2011.01)

(52) U.S. Cl.
CPC .......... *G06T 11/206* (2013.01); *G06F 16/904* (2019.01); *G06T 19/00* (2013.01)

(58) Field of Classification Search
None
See application file for complete search history.

(56) References Cited

U.S. PATENT DOCUMENTS

2010/0040281 A1* 2/2010 Chen .................... G06K 9/6229
382/156
2012/0317509 A1* 12/2012 Ludwig .................. G06F 17/10
715/781

(Continued)

*Primary Examiner* — Tize Ma
(74) *Attorney, Agent, or Firm* — Sterne, Kessler, Goldstein & Fox, P.L.L.C.

(57) ABSTRACT

Disclosed herein are system, method, and computer program product embodiments for generating and adjusting multi-dimensional data visualizations. An embodiment operates by a computer implemented method that includes evaluating, by at least one processor, data to be displayed on a multi-dimensional data visualization and information associated with the multi-dimensional data visualization. The method further includes determining one or more parameters for the multi-dimensional data visualization based on the evaluated data and the evaluated information. The method further includes generating the multi-dimensional data visualization based on the determined one or more parameters, where the multi-dimensional data visualization comprises at least four dimensions. The method also includes graphically displaying the multi-dimensional data visualization.

15 Claims, 11 Drawing Sheets

(56) References Cited

U.S. PATENT DOCUMENTS

2013/0097563 A1* 4/2013 Pacheco Rodrigues Velho ..........
G06F 3/04815
715/850
2017/0228917 A1* 8/2017 Robinson .............. G06T 15/005
2018/0024981 A1* 1/2018 Xia ....................... G06F 17/246
715/215

* cited by examiner

MULTI-DIMENSIONAL DATA VISUALIZATION

BACKGROUND

Graphs and charts are one way to graphically display the sets of data to the users. These graphs and charts are displayed on a number of different devices with different user interfaces and different requirements and parameters. The exponential growth of data in the digital transformation age leads to new requirements in software and digital experiences to facilitate the discovery of insights out of vast amounts of diverse data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, to enable exploration of large data volumes along multiple dimensions that can be provisioned in one semantically logical and user-relevant digital space.

Figure 1:
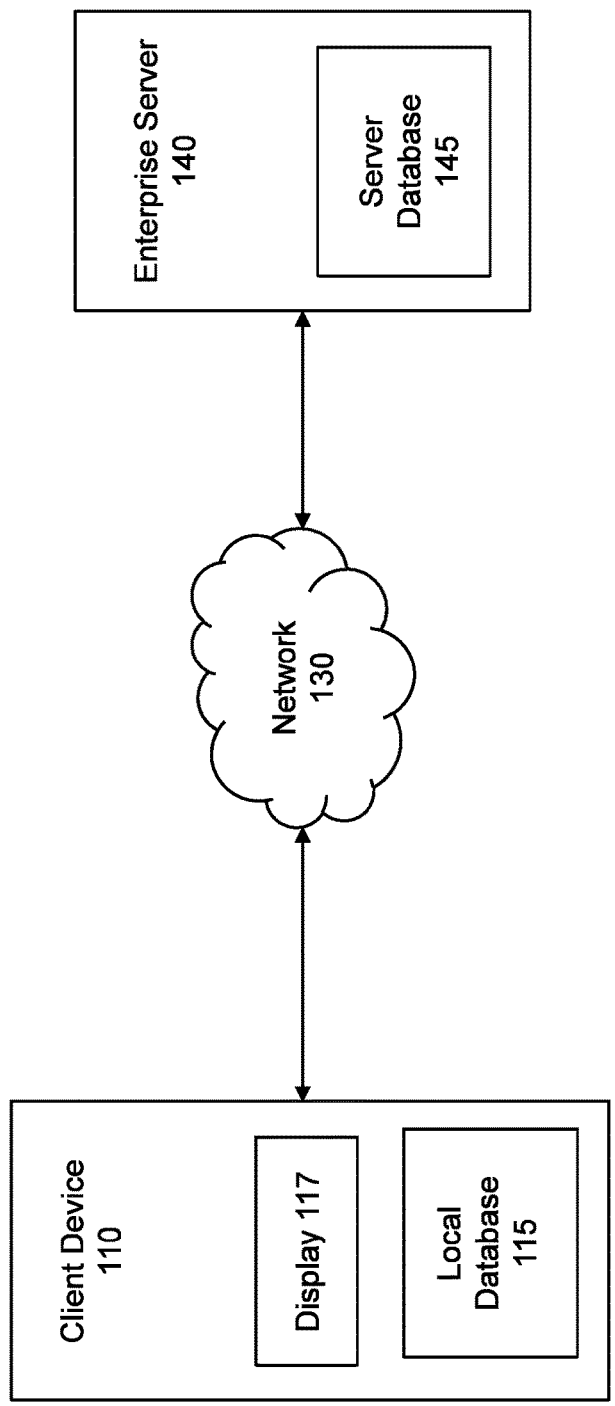
FIG. 1 is an illustration of an exemplary distributed system, according to some embodiments.

FIG. 1 is an illustration of an exemplary distributed system 100 in which embodiments described herein can be implemented. Distributed system 100 includes a client device 110 that is communicatively coupled to enterprise server 140 through network 130. Client device 110 can be any type of computing device having one or more processors, a user input (for example, a touch-screen, mouse, 3-dimensional (3D) mouse, QWERTY keyboard, microphone, 3D projectors, virtual reality (VR) and/or augmented reality (A/R) devices, and/or a T9 keyboard), and a communications infrastructure capable of receiving and transmitting data over a network. For example, computing device 110 can include, but is not limited to, a mobile phone or other mobile device, a personal digital assistant (PDA), a computer, a cluster of computers, a set-top box, or other similar type of device capable of processing instructions and receiving and transmitting data to and from humans and other computing devices. Similarly, enterprise server 140 can be any type of server or computing device capable of serving data to client device 110. Client device 110 can include a web application. The web application can be used by, for example, a visualization analytics generator/module (discussed in more detail below) to create multi-dimensional data visualizations, charts, graphs, etc. to be displayed as, for example, a Hypertext Markup Language (HTML) element structure such that a web browser would be able to render the multi-dimensional data visualizations. In some examples, the visualization analytics generator/module can create the multi-dimensional data visualization and display it using gaming development platforms (such as, but not limited to, Unity3D). In some examples, the visualization analytics generator/module can create the multi-dimensional data visualization and display it using different application programing interface (API) platforms (such as, but not limited to, WebGL and/or other API for rendering interactive 3D or two-dimensional (2D) graphics). However, it is noted that the embodiments of this disclosure are not limited to these examples and the multi-dimensional data visualization of the embodiments of this disclosure can be displayed using other technologies. According to one example, client device 110 can include a display 117, which can be used to display the multi-dimensional data visualization.

Network 130 can be any network or combination of networks that can carry data communication. Such network can include, but is not limited to, a wired (e.g., Ethernet) or a wireless (e.g., Wi-Fi, 3G, 4G, 5G, etc.) network. In addition, network 130 can include, but is not limited to, a local area network, medium area network, and/or wide area network such as the Internet. Network 130 can support protocols and technology including, but not limited to, Internet or World Wide Web protocols and/or services. Intermediate network routers, gateways, or servers may be provided between components of distributed system 100 depending upon a particular application or environment.

In an embodiment, enterprise server 140 includes a server database 145. Server database 145 may store any type of data, including, but not limited to, data to be used for analytics applications, that is accessible by enterprise server 140. Although only server database 145 is shown, additional databases may be used as necessary. For example, server database 145 can include a cloud database that can run, for example, on a cloud computing platform. In an embodiment, local database 115 is used to store data accessible by client device 110. For example, local database 115 may be implemented using any type of recording medium coupled to an integrated circuit that controls access to the recording medium. The recording medium can be, for example and without limitation, a semiconductor memory, a hard disk, or other similar type of memory or storage device. Moreover, local database 115 may be integrated within client device 110 or a stand-alone device communicatively coupled to client device 110 via a direct connection. For example, local database 115 may include an internal memory device of client device 110, a compact flash card, a secure digital (SD) flash memory card, or other similar type of memory device.

In an example, client device 110 may suffer from limitations such as reduced memory capabilities when compared to enterprise server 140. Therefore, data stored at local database 115 includes, but is not limited to, a subset of data found at server database 145. For example, local database 115 and server database 145 may each be relational databases. In an embodiment, the data stored at local database 115 can be synchronized with server database 145 over network 130.

Figure 2:
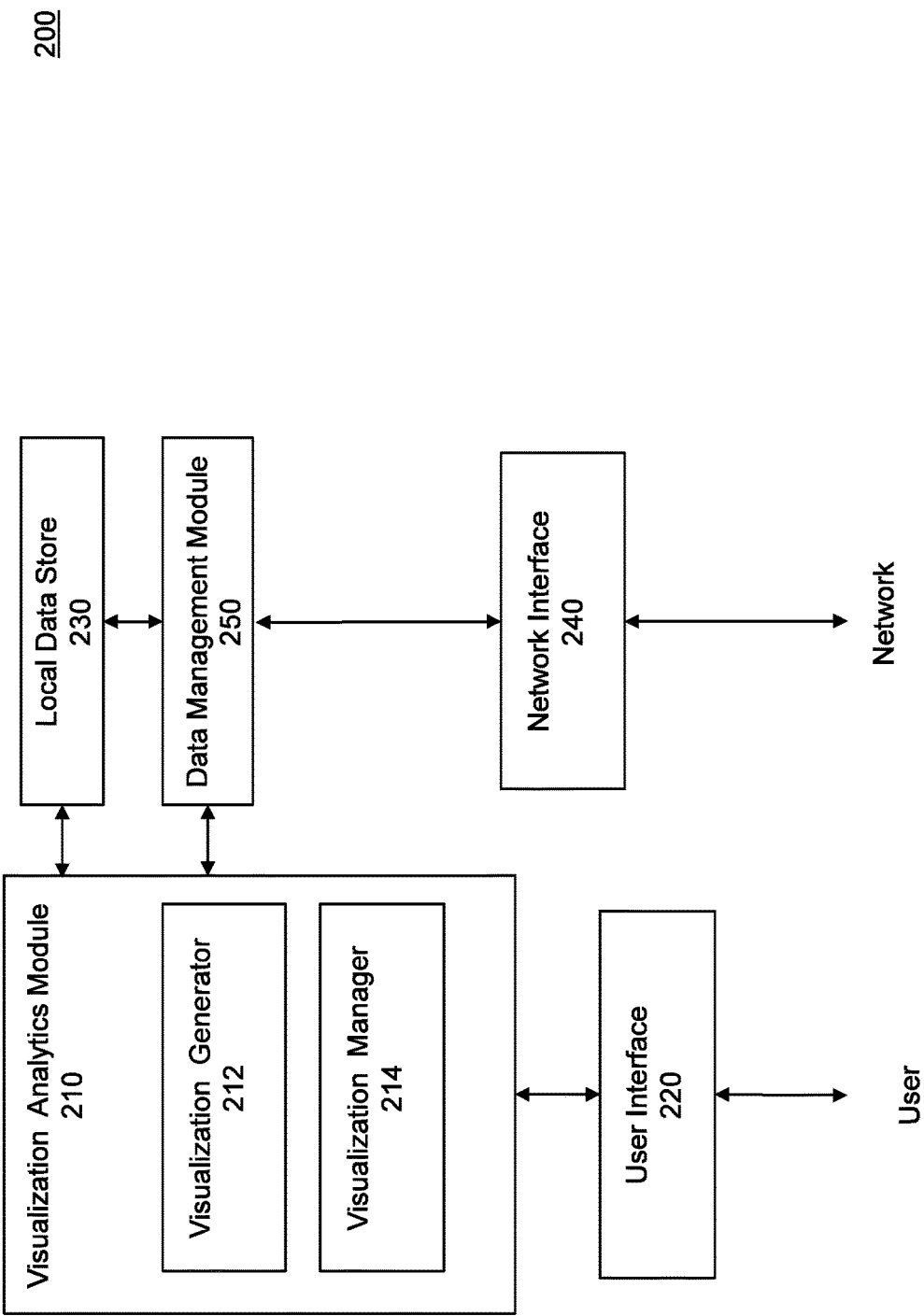
FIG. 2 is an architecture diagram of an exemplary device for displaying multidimensional data visualizations, according to some embodiments.

FIG. 2 is an architecture diagram of an exemplary device 200 for displaying multi-dimensional data visualizations, for example, two-dimensional and/or three-dimensional (3D)

graphs, charts, diagrams, and/or other data visualizations according to some embodiments.

Device 200 can include a visual analytics module 210, which can include a visualization generator 212 and a visualization manager 214. Device 200 can further include a local data store 230, which can include analytical data and information associated with a multi-dimensional visualization. Device 200 can also include a user interface 220, a network interface 240, a data management module 250.

According to some embodiments, visualization analytics module 210 is communicatively coupled to local data store 230, via, for example, an internal data bus of device 200. In an embodiment, local data store 230 can be a lightweight database (e.g., local database 115 of FIG. 1) holding some subset of data from an enterprise server database (e.g., enterprise database 145 of FIG. 1). It is noted that although data store 230 is illustrated as a local data store, the embodiments of this disclosure are not limited to a local data store. Data store 230 can be a local data store, a server database (e.g., server database 145), or a combination thereof. Visualization analytics module 210 can be configured to visualize expressions and/or analytical information in graphical views, such as multi-dimensional data visualizations. The graphical views are referred to herein as multi-dimensional visualizations, but it is noted that the embodiments of this disclosure can include any kind of charts and graphs such as, but not limited to, two-dimensional (2D) and/or three-dimensional (3D) graphs, charts, diagrams, and/or other data visualizations, etc.

According to some embodiments, device 200 is configured to enable exploration of large data volumes along multiple dimensions that can be provisioned in one semantically logical and user-relevant digital space. For example, device 200, using visualization analytics module 210, can be configured to visualize granular data that can facilitate pattern recognition. For example, device 200, using visualization analytics module 210, can be configured to keep the granularity data and also visualize the big picture represented by the data points, which can assist a user and/or an application to discover hidden structures within the large data that has been displayed.

According to some examples, device 200, using visualization analytics module 210, can be configured to display homogenous data and/or data with multiple aspects and/or qualities. In some embodiments, multiple aspects and/or qualities of the data can be displayed using multiple dimensions on the multi-dimensional data visualization. As a non-limiting example, if each data point is associated with a contact, the multiple aspects and/or qualities of the data point can include name, mailing address(es), email address(es), phone number(s), and any other related information. As another non-limiting example, if each data point is associated with an employee, the multiple aspects and/or qualities of the data point can include employee's identification number, employee's position, employee's salary, employee's number of years in the company, employee's office number, employee's phone number, employee's email address, and any other related information. As another non-limiting example, if each data point is associated with a good, the multiple aspects and/or qualities of the data point can include material(s) used to make the good, the year the good was made, the place the good was made, carbon fingerprint of the good, places where the good is stored and/or shipped to and/or shipped from, and any other related information.

In some embodiments, multiple aspects and/or qualities of the data can be displayed using multiple dimensions on the multi-dimensional data visualization. In some examples, multiple aspects and/or qualities of the data can be displayed using multiple dimensions simultaneously (e.g., at the same time) or substantially simultaneously (e.g., substantially at the same time) on the multi-dimensional data visualization.

According to some examples, a user of the multi-dimensional data visualization can gather insight(s) into the data when a number of data points displayed on the multi-dimensional data visualization have been consolidated in one area. By using the embodiments of this disclosure discussed in more detail below, a user, for example, can review and understand more information about the displayed data by, for example, interacting with the multi-dimensional data visualization.

In some examples, device 200, using visualization analytics module 210, can be configured to make large volumes of data interactive along multiple facets (e.g., user relevance, interaction mechanism, perspectives, etc.) In some embodiments, device 200, using visualization analytics module 210, can be configured for animation of live, stored data, and/or historical data for further insights. The animation of data can include, but is not limited to, displaying movements over time. In some example, the movement includes displaying the changes in data points over time. For example, the changes in data points over time can include changes in qualities and/or aspects of the data points over time. The animation of the changes in data points can assist in understanding how the qualities and/or aspects of data changes in time (e.g., the changes are slow, fast, what are patterns in the changes/movements, etc.) In some examples, visualization analytics module 210 uses one of the dimensions as the time dimension to visualize the status of data in time. Additionally or alternatively, in some examples, visualization analytics module 210 is configured to visualize the derivation of data points over time (such as, but not limited to, trends in data). In these examples, visualization analytics module 210 can be configured to visualize the changes in data points over time as a differential equation representing the changes in data points.

In some examples, device 200, using visualization analytics module 210, can be configured to allow flexible flow between levels of detail, for example, from an overview to an expert view. According to some examples, device 200, using visualization analytics module 210, can be configured to provide users an exploration of data down to single logical and informative data entry. Also, device 200, using visualization analytics module 210, can be configured to provide an option that two dimensional charts, figures, etc. can be derived from the multi-dimensional visualization.

According to some embodiments, visualization analytics module 210 is configured to adjust the multi-dimensional visualization based on inputs visualization analytics module 210 can receive. In some examples, these inputs can be provided by a user and based on the user's interaction with device 200 and/or the multi-dimensional data visualization displayed using device 200. For example, visualization analytics module 210 can provide a flexible flow along levels of detail from an overview to an expert view, based on the interactions. Additionally or alternatively, visualization analytics module 210 can provide a flexible flow down to single logical data entity and its details, based on the interaction. In some example, visualization analytics module 210 can provide flexible flow between 2D graphs derived from the multi-dimensional visualization.

In an embodiment, local data store 230 includes analytical data. Analytical data can include the analytical information and data that is to be visualized in the multi-dimensional visualization. For example, analytical data can include expressions, which may include, but are not limited to, mathematical expressions as well as prediction and statistical expressions. The aforementioned expressions are presented by way of example and not limitation. A person skilled in the relevant art given this description will appreciate that other types of expressions may be implemented as necessary. Analytical data can include expression data, which may include, but is not limited to, persistent analytics application data and/or aggregated historical analytics application data, such as, for example, aggregated key performance indicators ("KPI"). In an embodiment, device 200 can use network interface 240 to receive and update the analytical data, expressions, and/or expression data from an enterprise server over a network, as described above. In an example, such expressions can be predefined by an analytics application developer, and may be initially stored at an enterprise server and later retrieved via network interface 240 and stored at local data store 230.

According to some embodiments, the analytical data/information can include engineering data such as, but not limited to, changes to products, service, and support life cycle phases, etc. In some examples, the analytical data/information can include transportation data such as, but not limited to, failed, delayed, successful deliveries in transportation, shipment service activity, etc. According to some examples, the analytical data/information can include human capital management data such as, but not limited to, employee or applicant skills and business need. In some examples, the analytical data/information can include financial data such as, but not limited to, invoice tracking within regions, segments, units within a period closing execution, etc. In some embodiments, the analytical data/information can include supplier relationship management data such as, but not limited to suppliers portfolio matching and request for proposal processing along with delivered quality, availability to promise, etc. In some examples, the analytical data/information can include insurance information such as, but not limited to, claim management, amounts of loss, granting processing, fraud detection, etc. In some embodiments, the analytical data/information can include marketing data such as, but not limited to, interaction on various channels, product categories, etc. It is noted the analytical data/information are not limited to these examples and other data/information can also be used.

Local data store 230 can also include information associated with the multi-dimensional data visualization. According to some examples, information associated with the multi-dimensional data visualization can include information and parameters associated with the multi-dimensional data visualization to be visualized by device 200. As a non-limiting example, information associated with the multi-dimensional data visualization can include information and parameters such as whether the multi-dimensional data visualization is displayed as a 3D graph or a 2D graph. Additionally or alternatively, the information associated with the multi-dimensional data visualization can include information on the dimensions used for the multi-dimensional data visualization. For example, the multi-dimensional data visualization can be displayed using multiple dimensions. In some embodiments, the multiple dimensions can include two dimensions, three dimensions, four dimensions, five dimensions, six dimensions, seven dimensions, eight dimensions, nine dimensions, ten dimensions, eleven dimensions, twelve dimensions, or more. In some examples, the dimensions used for displaying the multi-dimensional data visualization can include, but is not limited to, X-axis, Y-axis, Z-axis, shape of data points, color of the data points, size of the data points, shadings of the data points, time sliders and/or movements, splitting the base of the data visualization into different segments, shape of the base and/or its segments, color of the base and/or its segments, size of the base and/or segments, shading and/or highlights of the base and/or its segments, and combinations thereof. It is noted that although examples are provided for the dimensions that can be used for the multi-dimensional data visualization, the embodiments of this disclosure are not limited to these examples and other dimensions can be used. For example, additional dimensions used for displaying the multi-dimensional data visualization can include dimensions of time (e.g., from present to past), movement (e.g., growth in quantity, aging, stagnation, etc.), and/or perspective (e.g., point of view in the data space.)

According to some embodiments, using different dimensions for displaying data in the multi-dimensional data visualization can assist in identification of structures within large data pools and can provide the availability of several data dimensions within one view. Additionally or alternatively, using different dimensions for displaying data in the multi-dimensional data visualization can assist in learning from changes of the point of view, for example, based on a user's role and/or interest in the data. In some embodiments, by using multi-dimensional data visualization, large number of data can be displayed in terms of their key characteristics, their movement, patterns, their relationship, etc. The multi-dimensional data visualization of some of the embodiments of this disclosure can provide visualization in 3D space and/or 2D space, interaction on different levels of aggregation and granularity, the animation of movement, etc., which can allow for exploration and views that would take various separate analytical and application views of the classical types to achieve.

Device 200 can use the information stored in local data store 230 (and/or information retrieved using network interface 240 from the network) to display the multi-dimensional data visualization using visualization analytics module 210. According to some embodiments, visualization analytics module 210 can include visualization generator 212 and visualization manager 214. In some embodiments, visualization generator 212 is configured to generate and display the multi-dimensional data visualization on a display of, for example, device 200 (for example display 117) based on the information visualization generator 212 receives from visualization manager 214. In an embodiment, visualization generator 212 analyzes the information received and/or retrieved from visualization manager 214 in order to generate the multi-dimensional data visualization. In some examples, visualization generator 212 is configured to create the chart to be displayed as a Hypertext Markup Language (HTML) element structure such that a web browser that would be able to render the multi-dimensional data visualization. However, it is noted that the embodiments of this disclosure are not limited to this example.

According to some embodiments, visualization manager 214 is configured to retrieve analytical data/information and information associated with the multi-dimensional data visualization from local data store 230 (and/or other data stores through network interface 240) and can manage the multi-dimensional data visualization to be generated and displayed by visualization generator 212. Additionally or alternatively, visualization manager 214 can receive information, parameters, and/or manipulations from a user and/or a developer through user interface 220. Visualization manager 214 with visualization generator 212 can use the user information in creating, updating, and/or displaying the multi-dimensional data visualization. In one example, visualization manager 214 is configured to determine the parameters of the multi-dimensional data visualization based on one or more of the analytical data/information, the information associated with the multi-dimensional data visualization, the information received from a user and/or a developer, etc. In some examples, visualization manager 214 is further configured to provide the determined parameters of the multi-dimensional data visualization to visualization generator 212, where visualization generator 212 can generate and display the multi-dimensional data visualization.

User interface 220 can include any interface a user can use to interact with visualization analytics module 210. According to some embodiments, user interface 220 can include, but is not limited to, a graphical user interface, a touchscreen, a mouse, a 3 dimensional (3D) mouse, QWERTY keyboard, microphone, 3D projectors, virtual reality (VR) and/or augmented reality (AR) devices (such as, but not limited to HoloLens), and/or a T9 keyboard. For example, visualization analytics module 210 can be configured to display the multi-dimensional data visualization on a 3D projector, a virtual reality device, and/or an augmented reality device. In some examples, a user can interact with visualization analytics module 210 to, for example, manipulate the multi-dimensional data visualization, using a 3D projector, a virtual reality device, and/or an augmented reality device. According to some embodiments, similar visualizations and/or interactions discussed in the embodiments of this disclosure can be performed using a 3D projector, a virtual reality device, and/or an augmented reality device. In some examples, user interface 220 can also include a mobile device and/or a mobile device control using special control application(s). It is noted that that although exemplary user interfaces are provided, the embodiments of this disclosure are not limited to these examples.

According to some examples, device 200 can include data management module 250. In some examples, data management module 250 can be configured to manage the data stored in local data store 230. For example, data management module 230 can be configured to synchronize local data store 230 with a server data store (not shown) through network interface 240. Additionally or alternatively, data management module 250 can work with visualization analytics module 210 to manage data in local data store 230, retrieve, and/or store data in a server data store (not shown) through network interface 240.

According to some examples, visualization analytics module 210 can be configured to stream live data and/or aggregate historical data. In one example, visualization analytics module 210 can receive the live data and/or aggregate historical data, and display them. For example, new data can be stored in local data store 230 and/or a server data store. Visualization analytics module 210 can be configured to retrieve the new data substantially in real-time and display it on the multi-dimensional data visualization. Additionally or alternatively, visualization analytics module 210 can be configured to retrieve and/or receive live data from the source of the data without the data being stored first. According to these examples, visualization analytics module 210 (alone or in combination with data management module 250) is configured to check local data store 230, the server data store, and/or other sources of the live data periodically for new data and display the new data on the multi-dimensional data visualization substantially in real-time when the new data is available. Additionally or alternatively, data management module 250 can periodically check for new data on local data store 230, the server data store, and/or other sources of the live data, and provide the new data to visualization analytics module 210 in substantially real-time. In some examples, visualization analytics module 210 can display the live data on the multi-dimensional data visualization as a movement in data over time. As discussed above, the movement can include displaying the changes in the qualities and/or aspects of data. A live observation in terms of the movements can be important in understanding of the dynamics of the system(s) represented by the data points and in taking measures that can have more immediate relevance.

According to some examples, visualization analytics module 210 can be configured to display historical data on the multi-dimensional data visualization. In one example, visualization analytics module 210 can be configured to retrieve the historical data and display it on the multi-dimensional data visualization. According to this example, visualization analytics module 210 (alone or in combination with data management module 250) is configured to check local data store 230 and/or the server data store periodically for the historical data and display it on the multi-dimensional data visualization. The exploration of live and historical data in the multi-dimensional data visualization can add the additional value of observing, movements in the data (e.g., the changes in the qualities and/or aspects of the data) either in substantially real-time or by navigating back and forth between past and present. Data movements can help a user's ability to detect patterns in movement.

According to some examples, visualization manager 214 can be configured to provide a capability to create new groups and/or segments of data. In one example, a user working with the multi-dimensional data visualization can select and/or create new groups and/or segments of data on the multi-dimensional data visualization based on the user's observation of data. In this example, visualization manager 214 in combination with visualization generator 212 can receive a request from the user and create the new group and/or segment of data. According to some examples, visualization manager 214 can be configured to provide a capability to share part of and/or all of the multi-dimensional data visualization with other users and/or applications. For example, a user working with the multi-dimensional data visualization can select and/or create new groups and/or segments of data on the multi-dimensional data visualization and can share the new groups and/or segments with other users and/or applications.

According to some examples, visualization analytics module 210 can receive requests from other applications (such as, but not limited to, other APIs) to display the data provided and/or displayed by the other application on the multi-dimensional data visualization. In these examples, visualization manager 214 can receive a request from another application to display the data provided by and/or displayed on that application on the multi-dimensional data visualization. In some examples, visualization manager 214 can receive and/or retrieve the other application's data and, in combination with visualization generator 212, generate and display the multi-dimensional data visualization.

According to some examples, visualization manager 214 can be configured to provide filters for filtering the data displayed on the multi-dimensional data visualization. For example, visualization manager 214 in combination with visualization generator 212 can provide filters on the multi-dimensional data visualization such that a user interacting with the multi-dimensional data visualization can provide parameters and/or information in order to filter some of the data displayed on the multi-dimensional data visualization. In one non-limiting example, the filtering can include removing and/or "ghosting" the data points that a user is not interested in (e.g., removing the data points or changing their colors.) It is noted that filtering is not limited to these examples and other criteria and actions can be used. In some examples, visualization manager 214 can receive the parameters and/or information from user interface 220. Visualization manager 214 can use the received parameters and/or information to adjust the multi-dimensional data visualization. Visualization manager 214 in combination with visualization generator 212 can display the adjusted multi-dimensional data visualization based on the filters. Additionally or alternatively, parameters and/or information associated with the filters can be provided in, for example, local data store 230. Visualization manager 214 can retrieve the parameters and/or information to adjust the multi-dimensional data visualization. Visualization manager 214 in combination with visualization generator 212 can display the adjusted multi-dimensional data visualization based on the filters. In some examples, by using the filters, a user can explore specific facets or business questions by reducing the overall volume along specific inquiries or user interests.

According to some examples, visualization manager 214 along with visualization generator 212 are configured to position the data points in the data space of the multi-dimensional data visualization along semantically related characteristics and dimensions. As a non-limiting example in the marketing context, the data points can be channel interactions of one individual known to the system as a contact (e.g., addressable, validated, and/or known by cookie identification (ID)). According to this non-limiting example, the multi-dimensional data visualization can be displayed using a 3D graph where one of the axis represents time and two other axis are semantic characteristics, such as, but not limited to, the type of data point or system status of the data point. Continuing with this non-limiting example, in the marketing context the dimensions of the multi-dimensional data visualization can include the time point of an interaction, the stage of the interaction (e.g., aware, interest, shopping, usage, etc.), product category (e.g., boards, clothes, shoes, accessories, etc.), etc. Continuing with this non-limiting example, in the marketing context, in some examples, visualization analytics module 210 can use one of the dimensions as the time dimension to visualize the status of data in time (e.g., movement for the interactions that does not lead to another marketing phase). Additionally or alternatively, in some examples, visualization analytics module 210 is configured to visualize the derivation of data points over time (such as, but not limited to, trends in data). In these examples, movement of the interactions can lead to other marketing phases.

As discussed above, visualization analytics module 210 is configured to receive parameters and/or information from a user through, for example, user interface 220. Visualization analytics module 210 can be configured to adjust the parameters of the multi-dimensional data visualization based on the received parameters and/or information and display the adjusted multi-dimensional data visualization. According to one example discussed above, a user of the multi-dimensional data visualization can use one or more filters to filter the data displayed on the multi-dimensional data visualization. According to some examples, a user can change the point of view on the multi-dimensional data visualization. For example, the point of view can be changed by rotating the multi-dimensional data visualization, zooming on a part of the multi-dimensional data visualization, changing a usage type on the multi-dimensional data visualization, etc. Additionally or alternatively, changing the point of view can include changing the number of dimensions used for displaying the multi-dimensional data visualization, choosing the dimensions used for displaying the multi-dimensional data visualization, changing the dimensions used for displaying the multi-dimensional data visualization, or a combination thereof.

In addition to or in alternate to the other examples, one example of changing the point of view can include displaying the multi-dimensional data visualization from the view point of one dimension. For example, users can buy a good using different platforms. These platforms can include different stores, different websites, etc. According to one example, each of the stores and/or websites can be one dimension and/or channel for displaying the data point associated with the bought good. One example of changing the point of view on the multi-dimensional data visualization can include displaying the data points that represent the goods bought only on one specified store. In this example, the view point on the multi-dimensional data visualization is changed such that only one dimension and/or channel within the dimensions and/or channels representing the place where the goods where bough is used. Although examples of changing the point of view on the multi-dimensional data visualization are presented, the embodiments of this disclosure are not limited to these examples.

In these examples, visualization manager 214 can receive parameters and/or information through, for example, user interface 220, where the parameters and/or information are based on the user's manipulation of the multi-dimensional data visualization (in these examples, changing the point of view.) For example, visualization manager 214 can receive a request to display the multi-dimensional data visualization from another view, where the request can include one or more dimensions corresponding to the other view. Visualization manager 214 can adjust the multi-dimensional data visualization based on, for example, the request, the parameters and/or the information, the one or more dimensions corresponding to the other view, etc. Visualization manager 214 along with visualization generator 212 can display the adjusted multi-dimensional data visualization. In one example, adjusting the multi-dimensional data visualization can include adjusting the parameters associated with the multi-dimensional data visualization based on the information received and/or retrieved.

According to some examples, the interaction between a user and the multi-dimensional data visualization can include changing the size of the multi-dimensional data visualization. In one example, changing the size can include enlarging or reducing the dimensions of the multi-dimensional data visualization. In these examples, visualization manager 214 can receive parameters and/or information through, for example, user interface 220, where the parameters and/or information are based on the user's manipulation of the multi-dimensional data visualization (in these examples, changing the size.) Visualization manager 214 can adjust the multi-dimensional data visualization. Visualization manager 214 along with visualization generator 212 can display the adjusted multi-dimensional data visualization.

According to some examples, the interaction between the user and the multi-dimensional data visualization can include requesting for additional information on a data point, a cluster of data points, clusters, etc. For example, a user can use a mouse over a data point to see additional information associated with the data point. In one example, one or more of the data points on the multi-dimensional data visualization can include context and detailed information. It is noted that the embodiments of this disclosure can include other method of requesting additional information. In these examples, visualization manager 214 can receive parameters and/or information through, for example, user interface 220, where the parameters and/or information are based on the user's manipulation of the multi-dimensional data visualization (in these examples, requesting for additional information.) Visualization manager 214 can adjust the multi-dimensional data visualization. Visualization manager 214 along with visualization generator 212 can display the adjusted multi-dimensional data visualization. In one example adjusting the multi-dimensional data visualization can include displaying a mouse-over popup to display the additional information. Additionally or alternatively, adjusting the multi-dimensional data visualization can include receiving, for example, a mouse click on a cluster, and displaying a cluster details screen.

According to some examples, the interaction between the user and the multi-dimensional data visualization can include providing a flexible flow from a 3D graph of the multi-dimensional data visualization to one or more 2D graphs of the multi-dimensional data visualization derived from the 3D graph. For example, visualization manager 214 can receive (e.g., through user interface 220) a request to display the multi-dimensional data visualization in a 2D graph. In some examples, visualization manager 214 can also receive one or more parameters associated with the 2D graph, such as, but not limited to, the dimensions of the multi-dimensional data visualization to be displayed, a range of data, a range and/or one or more segments of the base of the multi-dimensional data visualization, information associated to a point of view of the multi-dimensional data visualization, etc. Visualization manager 214 can adjust the multi-dimensional data visualization. Visualization manager 214 along with visualization generator 212 can display the adjusted multi-dimensional data visualization.

According to some examples, visualization manager 214 can be configured to detect a cluster of data points and visualization generator 212 can be configured to display the detected cluster(s) on the multi-dimensional data visualization. In some embodiments, a cluster of data points can include one or more data points with similar qualities and/or aspects. In some examples, visualization manager 214 is configured to retrieve and/or receive data to be displayed from, for example, local data store 230, and is further configured to determine one or more cluster of data from the retrieved and/or received data. In some embodiments, visualization manager 214 can be configured to determine the one or more clusters based on one or more criteria retrieved and/or received from, for example, local data store 230. Additionally or alternatively, the one or more clusters of data and/or information corresponding to the one or more clusters can be provided to visualization manager 214. In some examples, the one or more clusters of data and/or information corresponding to the one or more clusters can be provided to visualization manager 214 through network interface 240 and/or data management module 250 from an external device and/or module. Additionally or alternatively, the one or more clusters of data and/or information corresponding to the one or more clusters can be retrieved and/or received by visualization manager 214 through, for example, local data store 230 and/or data management module 250.

According to some examples, the multi-dimensional data visualization can include a time slider, which can be used to show how the data points change over time. In these examples, a user can use the slider on the multi-dimensional data visualization to observe how the qualities and/or aspects of data points change over time. Additionally or alternatively, the multi-dimensional data visualization can be configured to display the live and/or historical data as a movie, which animates the live and/or historical data in time. For example, the multi-dimensional data visualization can provide an interface (e.g., a play button, a pause button, rewind and forward buttons) where a user can use to view the movement of the data, as discussed above. This movement of data can provide insights to recognize and discover patterns.

According to some examples, visualization analytics module 210 can also provide options where a user can change the perspective of the multi-dimensional data visualization before and/or during the movement of data points on the multi-dimensional data visualization. For example, a user can request that visualization analytics module 210 change the perspective to a side axis, where the movements can be observed with individual data points recognizable. In another example, the user can request that visualization analytics module 210 change the perspective of the multi-dimensional data visualization to a front view, which can be two-dimensional, such that the movements can be observed as broader data sets. In these examples, visualization manager 214 can receive parameters and/or information through, for example, user interface 220, where the parameters and/or information are based on the user's manipulation of the multi-dimensional data visualization (in these examples, requesting for displaying data over time, changing perspectives, etc.) Visualization manager 214 can adjust the multi-dimensional data visualization. Visualization manager 214 along with visualization generator 212 can display the adjusted multi-dimensional data visualization.

According to some examples, the interaction between a user and the multi-dimensional data visualization can include manipulating a base of the multi-dimensional data visualization. In some examples, manipulating the base of the multi-dimensional data visualization can include clicking on a based segment to spotlight the relevant area. Additionally or alternatively, manipulating the base of the multi-dimensional data visualization can include moving margins of the highlighted base segment to a certain margin area. However, it is noted that manipulating the base of the multi-dimensional data visualization can include other interactions between the user and the base of the multi-dimensional data visualization. In these examples, visualization manager 214 can receive parameters and/or information through, for example, user interface 220, where the parameters and/or information are based on the user's manipulation of the multi-dimensional data visualization (in these examples, manipulation of the base of the multi-dimensional data visualization.) Visualization manager 214 can adjust the multi-dimensional data visualization. Visualization manager 214 along with visualization generator 212 can display the adjusted multi-dimensional data visualization. In one example, adjusting the multi-dimensional data visualization can include highlighting the base segment that was clicked on, displaying information associated with the highlighted area, and/or displaying information associated with the part of the base segment indicated by the margin manipulated by the user.

According to some examples, visualization manager 214 can retrieve the parameters and/or information associated with the multi-dimensional data visualization from, for example, local data store 230. From the retrieved parameters and/or information, visualization manager 214 can determine whether any title, descriptions, and/or labels to be displayed and can determine the size, color, and/or font of the multi-dimensional data visualization's title, descriptions, and/or labels.

FIGS. 3A-3F illustrate exemplary views of multi-dimensional data visualizations, according to some embodiments. According to some examples, multi-dimensional data visualizations 300, 320, 340, 360, 370, and 380 of FIGS. 3A-3F can be generated and displayed using device 200 of FIG. 2. For example, chart manager 214 and chart generator 212 are configured to generate multi-dimensional data visualizations 300, 320, 340, 360, 370, and 380, and/or any combination thereof, based on data stored in local data store 230 and/or data retrieved from a user. It is noted that these multi-dimensional data visualizations are depicted as examples and the embodiments of this disclosure are not limited to these examples and other multi-dimensional data visualization (such as any combination of multi-dimensional data visualization 300, 320, 340, 360, 370, and 380) can be generated and displayed.

Figure 3A:
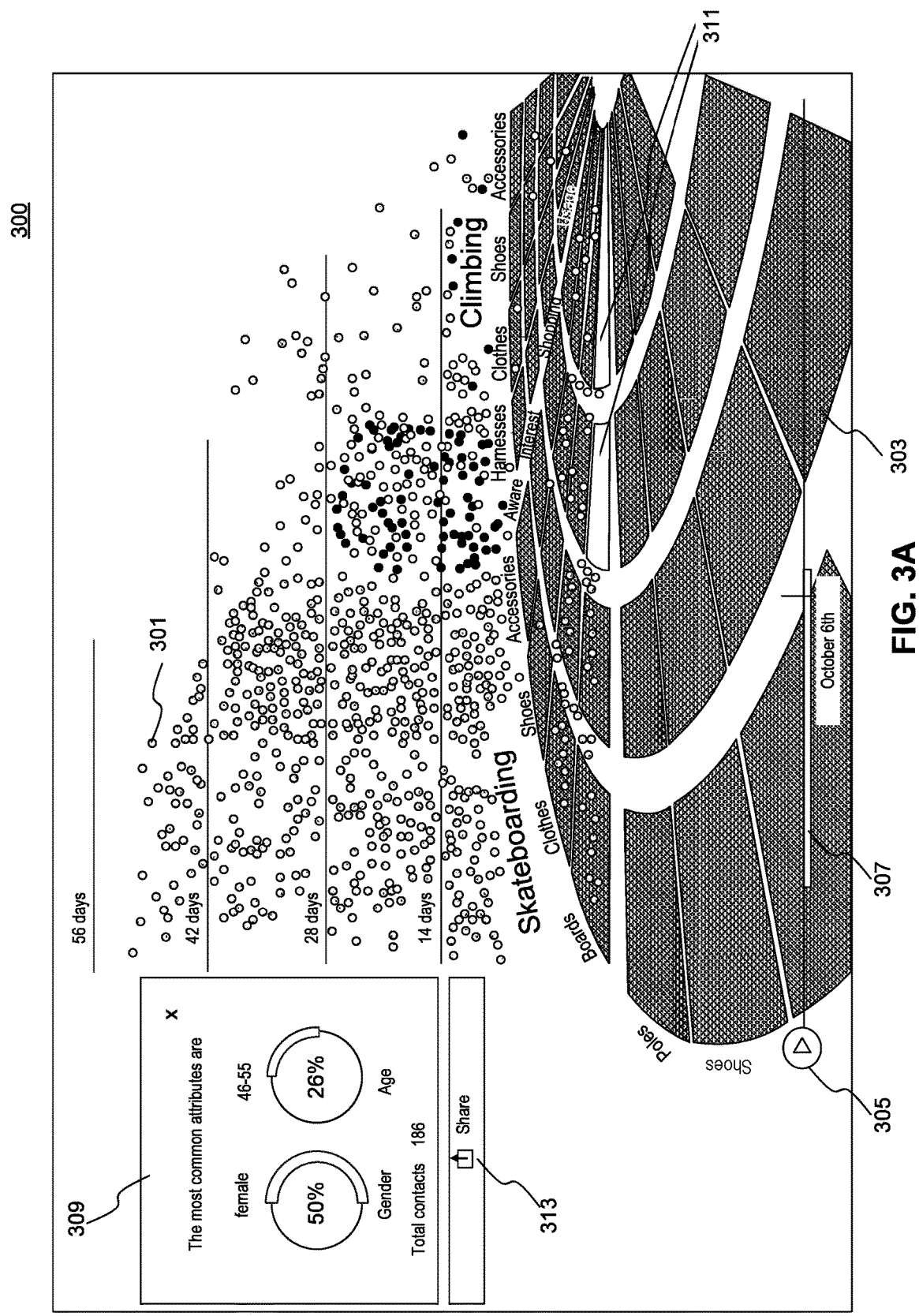
FIGS. 3A-3F illustrate exemplary views of exemplary multi-dimensional data visualizations, according to some embodiments.

FIG. 3A illustrates a view of multi-dimensional data visualization 300 that illustrates a base 303 that is divided into segments and also illustrates data points 301. It is noted that although multi-dimensional data visualization 300 illustrates base 303 as a disk and data points 301 as bubbles, the embodiments of this disclosure are not limited to these examples and other shapes, figures, outlines, etc. can be used to display the base and the data points. As discussed above, multi-dimensional data visualization 300 can be displayed using multiple dimensions. In some examples, the dimensions used for displaying multi-dimensional data visualization 300 can include, but is not limited to, X-axis, a Y-axis, a Z-axis, a shape of data points, a color of the data points, a size of the data points, a shading of the data points, a time slider, a movement of the data points, segments of the base of the multi-dimensional data visualization, a shape of the base of the multi-dimensional data visualization, a shape of the segments of the base of the multi-dimensional data visualization, a color of the base of the multi-dimensional data visualization, a color of the segments of the base of the multi-dimensional data visualization, a size of the base of the multi-dimensional data visualization, a size of the segments of the base of the multi-dimensional data visualization, a shading of the base of the multi-dimensional data visualization, and a shading of the segments of the base of the multi-dimensional data visualization.

In some examples, displaying multi-dimensional data visualization 300 can also include displaying an interface 305, which can be used to start and/or stop displaying the movement in changes in the data points. Also, displaying multi-dimensional data visualization 300 can also include displaying a time bar 307. In some examples, time bar 307 can be used to show the instant of time for which data points 301 are displayed. Additionally or alternatively, time bar 307 can be used by, for example, a user, to move between instances of time. According to some embodiments, displaying multi-dimensional data visualization 300 can also include displaying text box 309, which can display information regarding a cluster of data points. It is noted that text box 309 can also be used to display any other information. As one non-limiting example, text box 309 can include a section 313, which can be used to share multi-dimensional data visualization 300 or part(s) of it with other users and/or application.

Figure 3B:
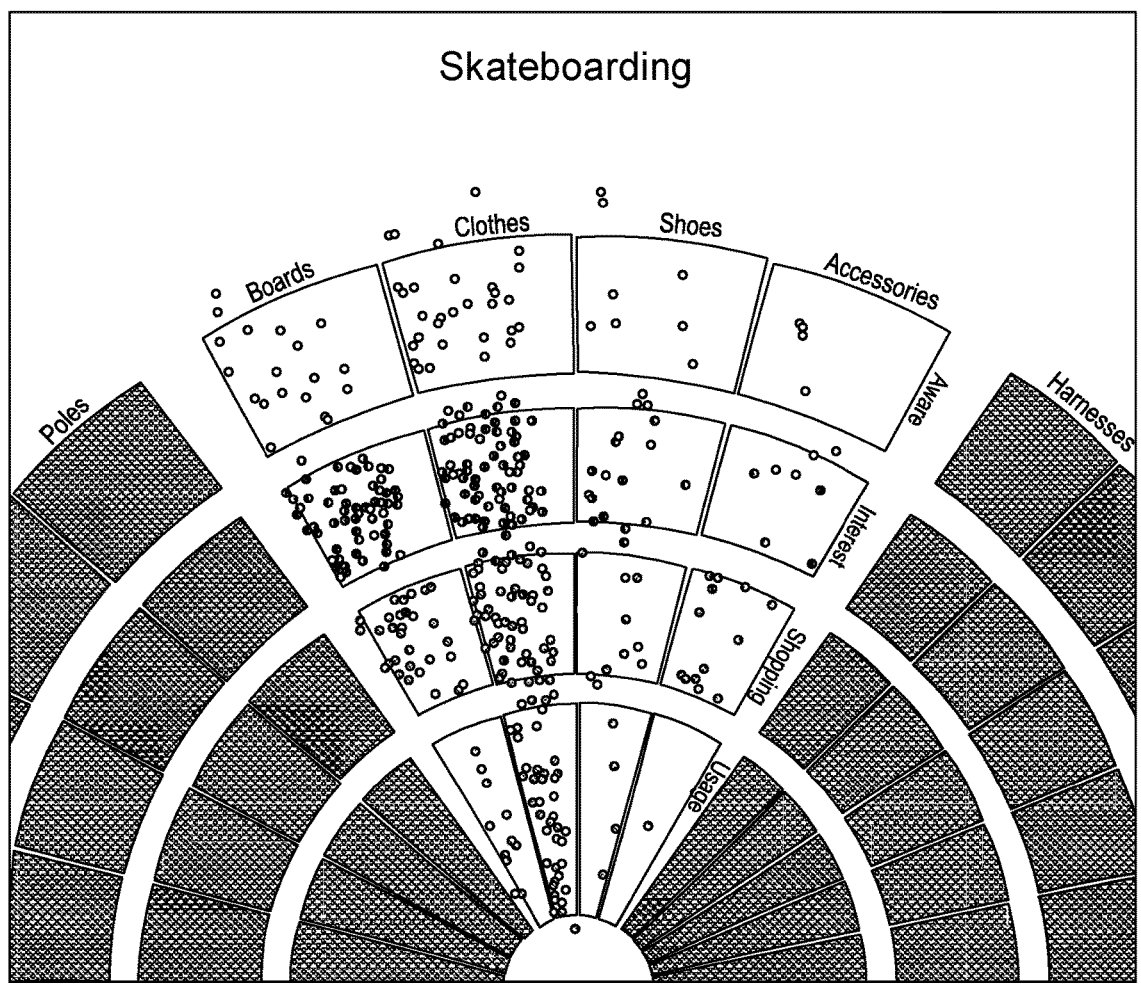

According to some examples, a user can select one or more segments of base 303 to focus on the data points associated with the selected segments. For example, as illustrated in FIG. 3A, segments 311 of base 303 can be selected such that, for example, data points associated with these segments can be reviewed. In this example, the data points associated with selected segments 311 are shown with black bubbles and white bubbles. In this example, other data points are illustrated as white bubbles with black dots inside them FIG. 3B illustrates a 2D view of multi-dimensional data visualization 320, according to some embodiments. In some example, 2D view 320 can be a 2D view of a 3D multi-dimensional data visualization, such as, multi-dimensional data visualization 300 of FIG. 3A. As discussed above, according to some examples, an interaction between a user and the multi-dimensional data visualization can include providing a flexible flow from a 3D graph of the multi-dimensional data visualization to one or more 2D graphs of the multi-dimensional data visualization derived from the 3D graph.

Figure 3C:
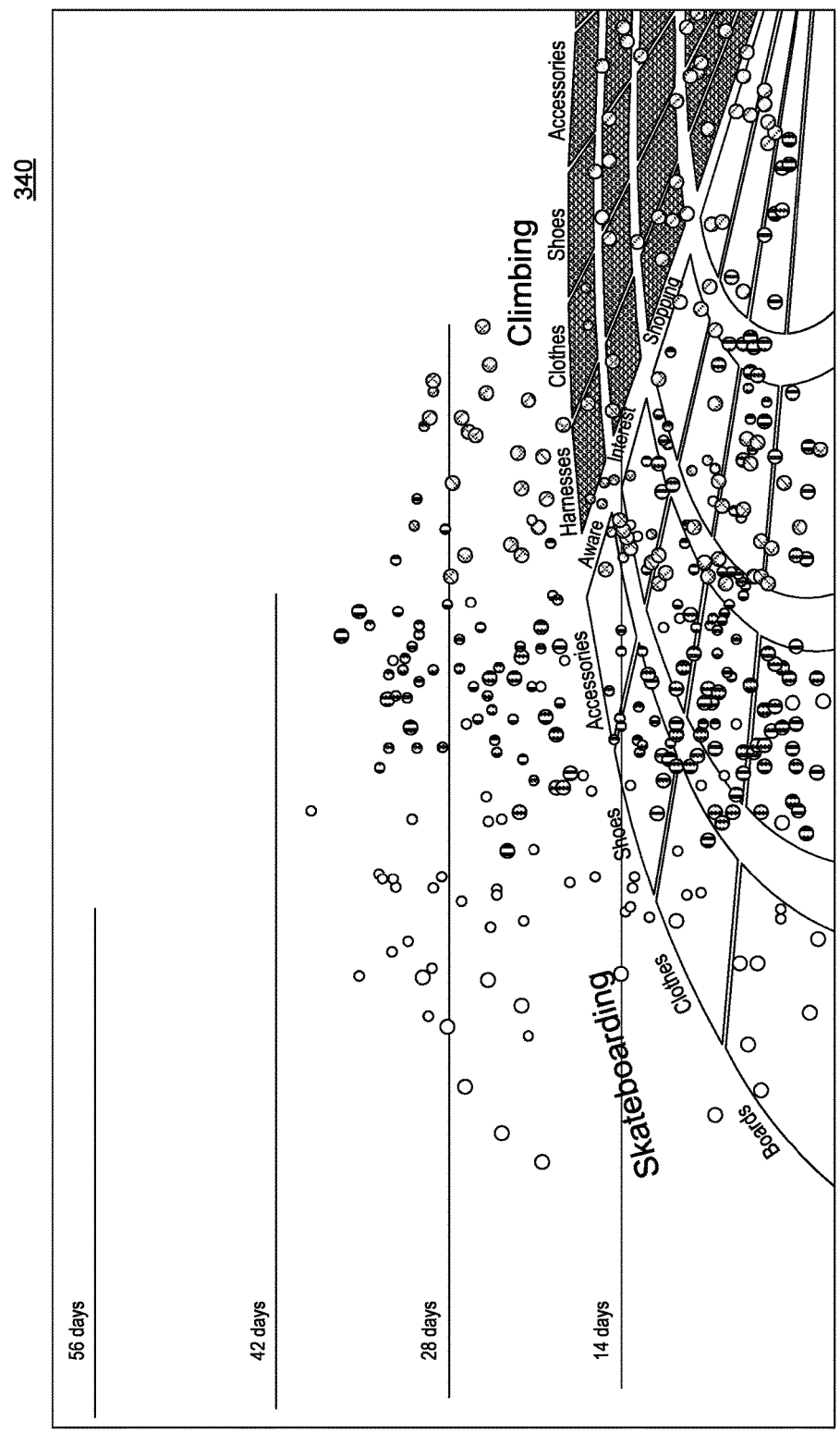

FIG. 3C illustrates a view of multi-dimensional data visualization 340, according to some embodiments. According to this non-limiting example, data points have different shapes and different shading (e.g., colors) based on their different qualities and/or aspects.

Figure 3D:
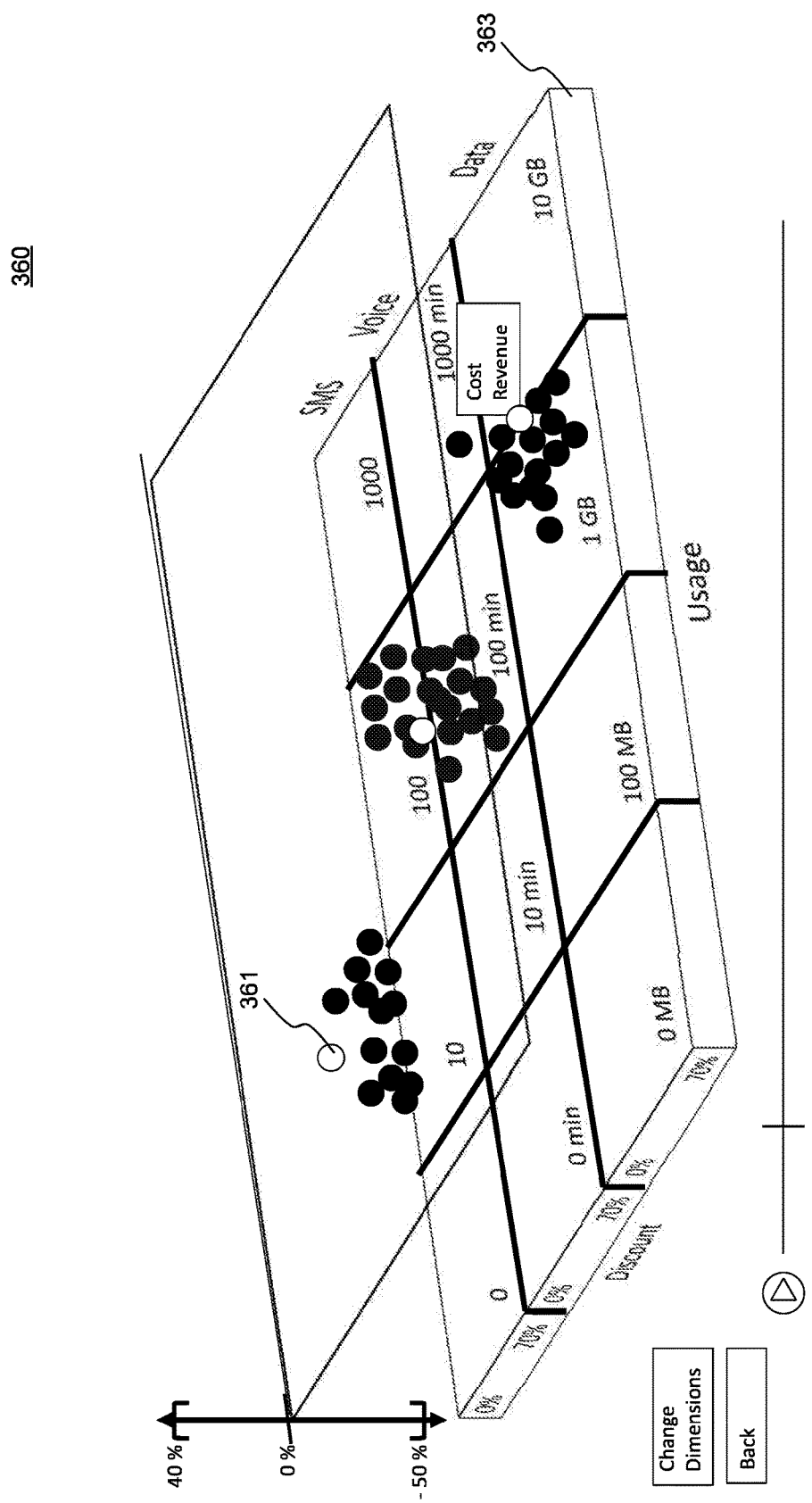

FIG. 3D illustrates another view of multi-dimensional data visualization 360, according to some embodiments, which illustrates a base 363 that is divided into segments and also illustrates data points 361. It is noted that although multi-dimensional data visualization 360 illustrates base 363 as cubes and data points 361 as bubbles, the embodiments of this disclosure are not limited to these examples and other shapes, figures, outlines, etc. can be used to display the base and the data points.

Figure 3E:
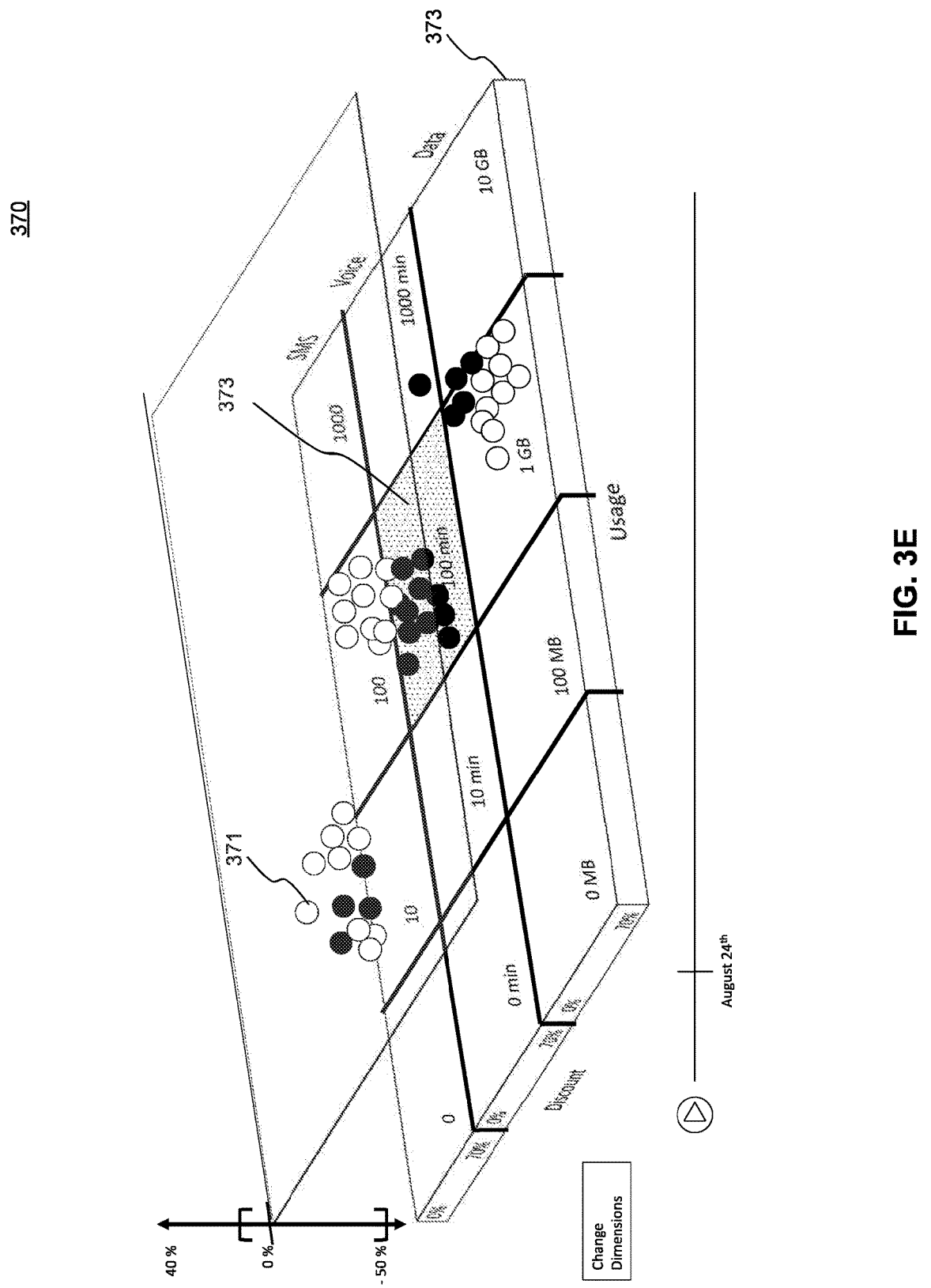

FIG. 3E illustrates another view of multi-dimensional data visualization 370, according to some embodiments, which illustrates a base 373 that is divided into segments and also illustrates data points 371. In one example, a user can select one or more segments of base 373 to focus on the data points associated with the selected segments. For example, as illustrated in FIG. 3E, segment 375 of base 373 can be selected such that, for example, data points associated with these segments can be reviewed.

Figure 3F:
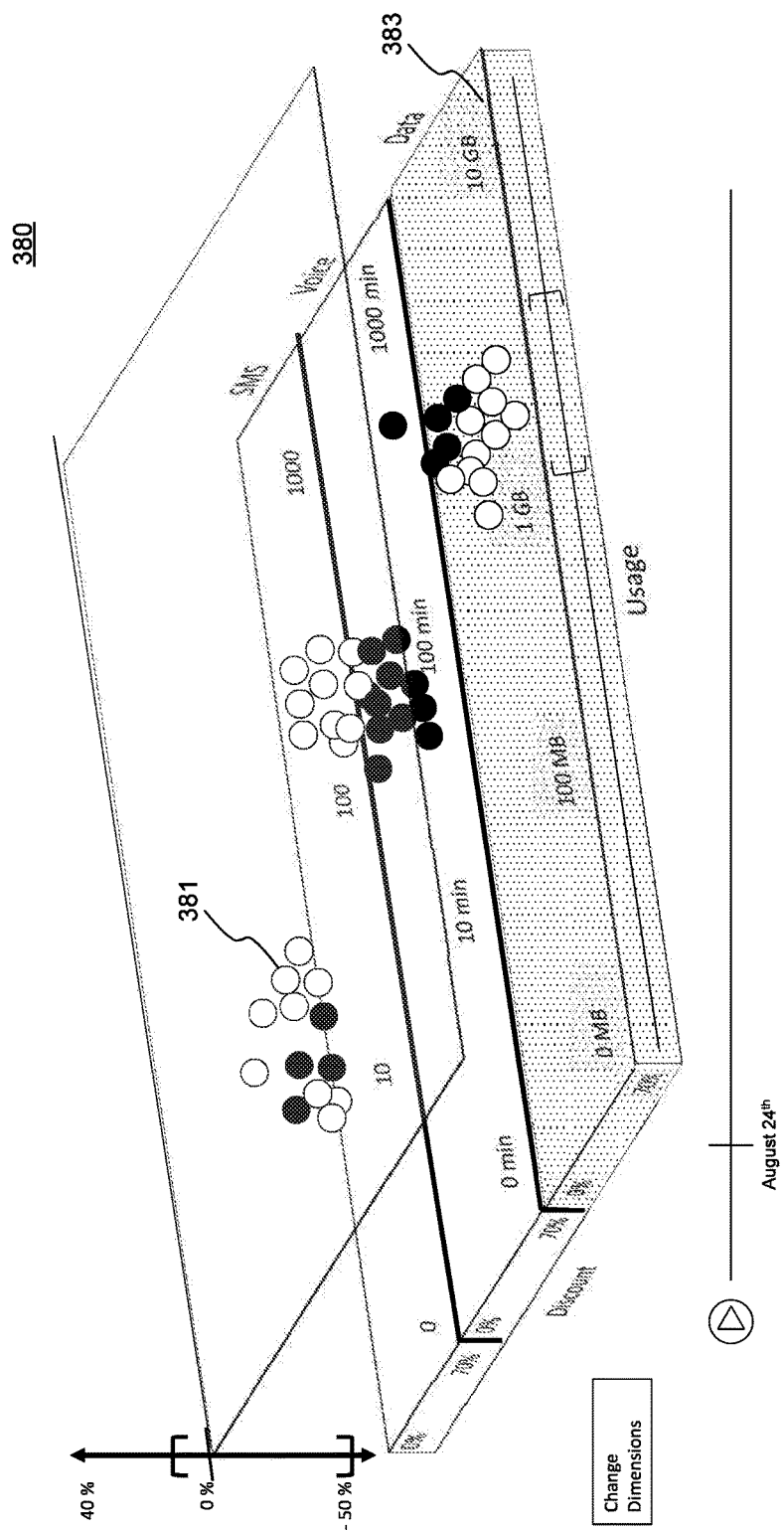

FIG. 3F illustrates another view of multi-dimensional data visualization 380, according to some embodiments, which illustrates a base 383 that is divided into segments and also illustrates data points 381. It is noted that although multi-dimensional data visualization 380 illustrates base 383 as lanes and data points 381 as bubbles, the embodiments of this disclosure are not limited to these examples and other shapes, figures, outlines, etc. can be used to display the base and the data points.

Figure 4:
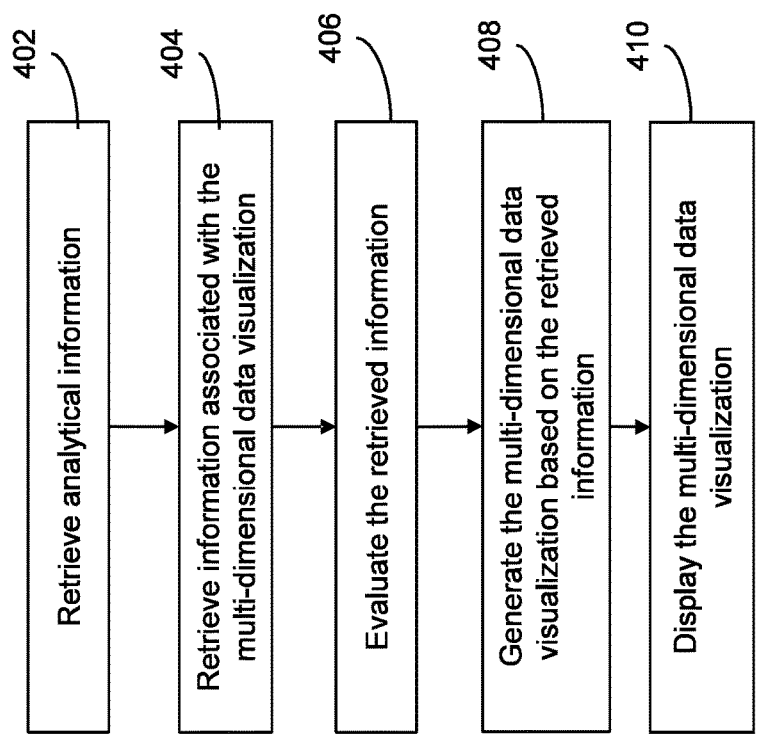
FIG. 4 is a flowchart for a method for displaying a multi-dimensional data visualization, according to some embodiments.

FIG. 4 is a flowchart for a method 400, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1, 2, and 3A-3F. However, method 400 is not limited to these example embodiments.

Although not shown, method 400 can start with a request to create and render a multi-dimensional data visualization. For example, visualization analytics module 210 and more specifically, visualization manager 214 can receive a request to create and render a multi-dimensional data visualization. The request can be initiated by an application (including, but not limited to, for example, a web application) running on device 200 that desires to render the multi-dimensional data visualization.

In 402, visualization manager 214 retrieves analytical information from, for example, local data store 230. Analytical information includes information in the analytical data, which as discussed above, can include the data that is to be visualized in the multi-dimensional data visualization, expressions, and/or expression data.

In 404, visualization manager 214 retrieves information associated with the multi-dimensional data visualization from, for example, local data store 230. According to some example, information associated with the multi-dimensional data visualization can include information and one or more parameters associated with the multi-dimensional data visualization to be visualized by device 200.

In 406, visualization manager 214 evaluates the retrieved information and determines the parameters for the multi-dimensional data visualization based on the evaluation. In one embodiment, visualization manager 214 evaluates the retrieved information (e.g., analytical data, the information associated with the multi-dimensional data visualization, any information received and/or retrieved from a user and/or a developer etc.) to determine the parameters for the multi-dimensional data visualization. In some embodiments, the parameters of the multi-dimensional data visualization can include the number of dimensions and the design of the dimensions to be used for displaying the data. As discussed above, in some examples, the dimensions used for displaying the multi-dimensional data visualization can include, but is not limited to, X-axis, Y-axis, Z-axis, shape of data points, color of the data points, size of the data points, shadings of the data points, time sliders and/or movements, splitting the base of the data visualization into different segments, shape of the base and/or its segments, color of the base and/or its segments, size of the base and/or segments, shading and/or highlights of the base and/or its segments, and combinations thereof.

In one example, based on the evaluated information, visualization manager 214 can determine the parameters of the multi-dimensional data visualization and can send these parameters to visualization generator 212. In 408, visualization generator 212 alone or in combination with visualization manager 214 can generate the multi-dimensional data visualization based on the determined multi-dimensional data visualization's parameters. In 410, visualization generator 212 alone or in combination with visualization manager 214 renders the multi-dimensional data visualization on, for example, a display of device 200.

Figure 5:
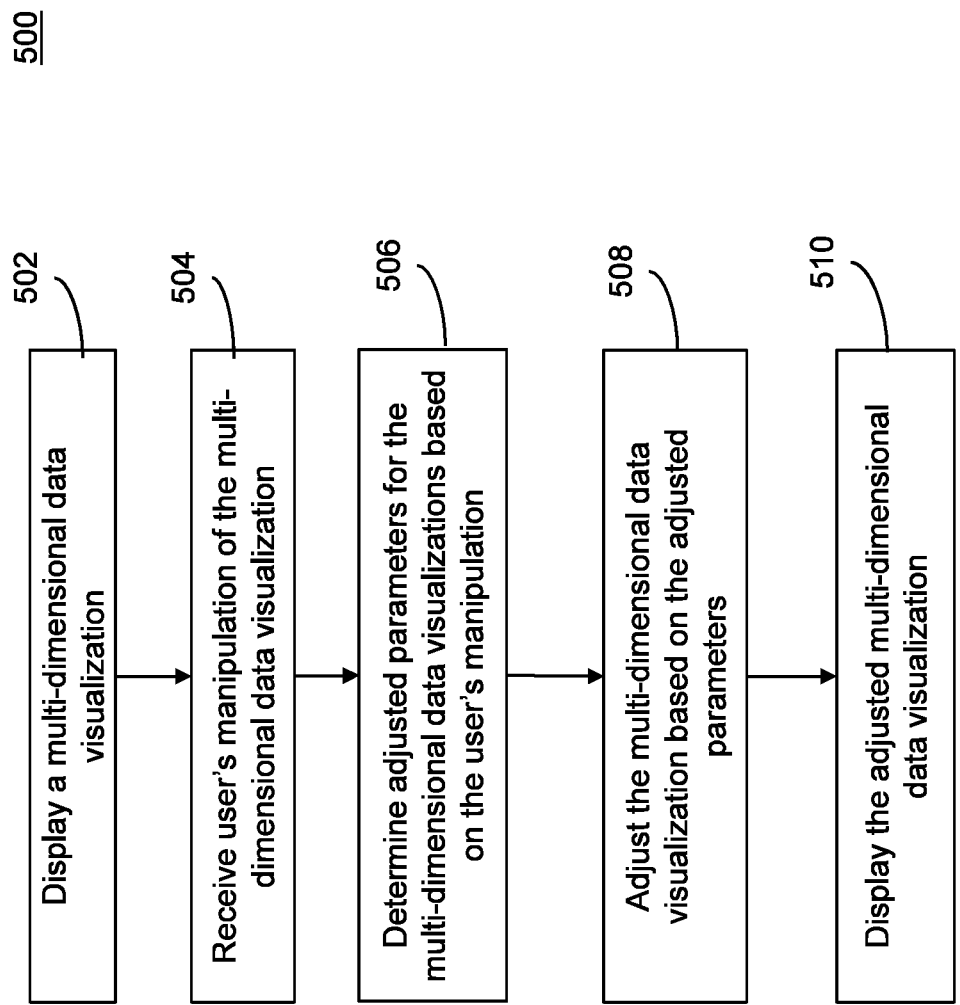
FIG. 5 is a flowchart for a method for adapting a multi-dimensional data visualization based on user manipulation, according to some embodiments.

FIG. 5 is a flowchart for a method 500 for adapting a chart based on user manipulation, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1, 2, and 3A-3F. However, method 500 is not limited to these example embodiments.

In 502, visualization manager 214 alone or in combination with visualization generator 212 renders a multi-dimensional data visualization on a display of, for example, device 200.

In 504, visualization manager 214 receives information associated with user's manipulation of the multi-dimensional data visualization. In one example, visualization manager 214 can receive the information associated with the manipulation through user interface 220. According to some examples, the user's manipulation can include using one or more filters to filter the data displayed on the multi-dimensional data visualization. According to some examples, the user's manipulation can include changing the point of view on the multi-dimensional data visualization. According to some examples, the interaction between the user and the multi-dimensional data visualization can include changing the size of the multi-dimensional data visualization. According to some examples, the interaction between the user and the multi-dimensional data visualization can include requesting for additional information on a data point, a cluster of data points, clusters, etc. According to some examples, the multi-dimensional data visualization can include a time slider, which can be used to show how the data points change over time. In these examples, the user's manipulation can include using the slider on the multi-dimensional data visualization to observe the data points over time. Additionally or alternatively, the multi-dimensional data visualization can be configured to display the live and/or historical data as a movie, which animates the live and/or historical data in time. According to some examples, the interaction between a user and the multi-dimensional data visualization can include manipulating a base of the multi-dimensional data visualization. Although exemplary interactions are discussed, it is noted that the embodiments of this disclosure are not limited to these examples and this disclosure can include other user manipulations.

In 506, visualization manager 214 can determine adjusted parameters for the multi-dimensional data visualization based on the retrieved information associated with the user manipulation. Additionally, visualization manager 214 is configured to adjust the multi-dimensional data visualization when at least one of the analytical data, the information associated with the multi-dimensional data visualization, etc. changes. In one example, visualization manager 214 can send these adjusted parameters to visualization generator 212.

In 508, visualization generator 212 alone or in combination with visualization manager 214 can generate the adjusted multi-dimensional data visualization based on the adjusted parameters. In 510, visualization generator 212 alone or in combination with chart visualization 214 renders the adjusted multi-dimensional data visualization.

Figure 6:
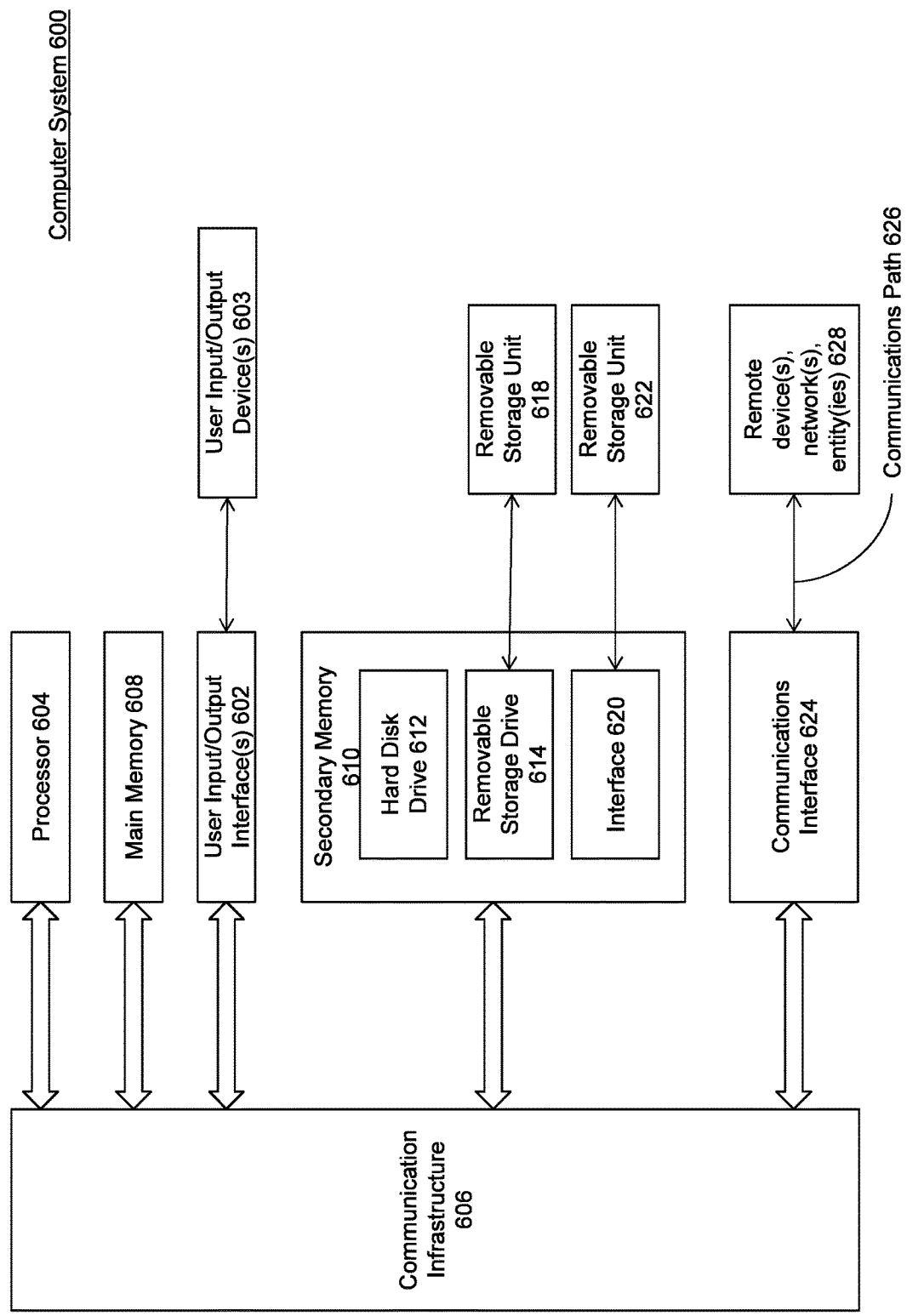
FIG. 6 is an example computer system useful for implementing various embodiments.

Various embodiments can be implemented, for example, using one or more computer systems, such as computer system 600 shown in FIG. 6. Computer system 600 can be used, for example, to implement method 400 of FIG. 4 and/or method 500 of FIG. 5. For example, computer system 600 can generate and adapt charts such as charts discussed with respect to FIGS. 1, 2, and 3A-3F, according to some embodiments. Computer system 600 can further calculate a sum over block(s) of data in the generated table data structure, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method, comprising:
   evaluating, by at least one processor, data to be displayed on a multi-dimensional data visualization and information associated with the multi-dimensional data visualization;

determining, by the at least one processor, one or more parameters for the multi-dimensional data visualization based on the evaluated data and the evaluated information;

generating, by the at least one processor, the multi-dimensional data visualization based on the determined one or more parameters, wherein the multi-dimensional data visualization comprises at least four dimensions and each dimension of the four dimensions is used for displaying one aspect of the data, wherein the multi-dimensional data visualization comprises a plurality of data points corresponding to the data, and wherein generating the multi-dimensional data visualization comprises detecting; based on one or more criteria, a cluster of data points of the plurality of data points;

graphically displaying, at a user interface, by the at least one processor; the multi-dimensional data visualization including the cluster of data points;

receiving, by the at least one processor, a first request to display the multi-dimensional data visualization from another view, wherein the request includes one or more dimensions corresponding to the other view;

receiving, by the at least one processor, a second request to graphically display a movement of changes in the data in time; and adjusting, by the at least one processor and while displaying the movement of the changes in the data in time, the multi-dimensional data visualization based on the one or more dimensions corresponding to the other view.

2. The method of claim 1, wherein three of the at least four dimensions of the multi-dimensional data visualization comprises three of an X-axis; a Y-axis; a Z-axis, a shape of data points; a color of the data points, a size of the data points; a shading of the data points, a time slider, and a movement of the data points.

3. The method of claim 1; wherein one of the at least four dimensions of the multi-dimensional data visualization comprises segments of a base of the multi-dimensional data visualization or a shape of the base of the multi-dimensional data visualization and wherein three of the at least four dimensions of the multi-dimensional data visualization comprises three of a shape of the segments of the base of the multi-dimensional data visualization, a color of the base of the multi-dimensional data visualization, a color of the segments of the base of the multi-dimensional data visualization; a size of the base of the multi-dimensional data visualization, a size of the segments of the base of the multi-dimensional data visualization, a shading of the base of the multi-dimensional data visualization, and a shading of the segments of the base of the multi-dimensional data visualization.

4. The method of claim 1, further comprising:
adjusting the multi-dimensional data visualization, by the at least one processor, when the information associated with the multi-dimensional data visualization changes; and
graphically displaying, by the at least one processor, the adjusted multi-dimensional data visualization on a display of the device.

5. The method of claim 4, wherein the information associated with the multi-dimensional data visualization changes based on a user's manipulation.

6. The method of claim 1, wherein the multi-dimensional data visualization is graphically displayed in a three-dimensional graph.

7. The method of claim 1, further comprising:
graphically displaying, by the at least one processor, the adjusted multi-dimensional data visualization.

8. The method of claim 1, further comprising:
receiving, by the at least one processor; a request for displaying additional information associated with at least one data point of the plurality of the data points, wherein the additional information is in addition to the aspects of the at least one data point displayed using the at least four dimensions; and
graphically displaying, by the at least one processor, the additional information on the multi-dimensional data visualization, while the multi-dimensional visualization enables detection of one or more patterns within the plurality of data points.

9. A system, comprising:
a memory; and
at least one processor coupled to the memory and configured to:
evaluate data to be displayed on a multi-dimensional data visualization and information associated with the multi-dimensional data visualization;
determine one or more parameters for the multi-dimensional data visualization based on the evaluated data and the evaluated information;
generate the multi-dimensional data visualization based on the determined one or more parameters,
wherein the multi-dimensional data visualization comprises at least four dimensions and each dimension of the four dimensions is used for displaying one aspect of the data,
wherein the multi-dimensional data visualization comprises a plurality of data points corresponding to the data, and
wherein generating the multi-dimensional data visualization comprises detecting, based on one or more criteria, a cluster of data points of the plurality of data points;
graphically display, at a user interface, the multi-dimensional data visualization including the cluster of data points;
receive a first request to display the multi-dimensional data visualization from another view, wherein the request includes one or more dimensions corresponding to the other view;
receive a second request to graphically display movement of chances in the data in time; and
adjust, while displaying the movement of the changes in the data in time, the multi-dimensional data visualization based on the one or more dimensions corresponding to the other view.

10. The system of claim 9, wherein three of the at least four dimensions of the multi-dimensional data visualization comprises three of an X-axis, a Y-axis, a Z-axis, a shape of data points, a color of the data points, a size of the data points, a shading of the data points, a time slider, and a movement of the data points.

11. The system of claim 9, wherein one of the at least four dimensions of the multi-dimensional data visualization comprises segments of a base of the multi-dimensional data visualization or a shape of the base of the multi-dimensional data visualization and wherein three of the at least four dimensions of the multi-dimensional data visualization comprises three of a shape of the segments of the base of the multi-dimensional data visualization, a color of the base of the multi-dimensional data visualization, a color of the segments of the base of the multi-dimensional data visualization, a size of the base of the multi-dimensional data visualization, a size of the segments of the base of the multi-dimensional data visualization, a shading of the base of the multi-dimensional data visualization, and a shading of the segments of the base of the multi-dimensional data visualization.

12. The system of claim 9, wherein the multi-dimensional data visualization is graphically displayed in a three-dimensional graph.

13. The system of claim 9, the at least one processor further configured to:
graphically display the adjusted multi-dimensional data visualization.

14. A tangible computer-readable device having instructions stored thereon that, when executed by at least one computing device, causes the at least one computing device to perform operations comprising:
evaluating data to be displayed on a multi-dimensional data visualization and information associated with the multi-dimensional data visualization;
determining one or more parameters for the multi-dimensional data visualization based on the evaluated data and the evaluated information;
generating the multi-dimensional data visualization based on the determined one or more parameters,
wherein the multi-dimensional data visualization comprises at least four dimensions and each dimension of the four dimensions is used for displaying one aspect of the data,
wherein the multi-dimensional data visualization comprises a plurality of data points corresponding to the data, and
wherein generating the multi-dimensional data visualization comprises detecting, based on one or more criteria, a cluster of data points of the plurality of data points; and
graphically displaying, at a user interface, the multi-dimensional data visualization including the cluster of data points;
receiving a first request to display the multi-dimensional data visualization from another view, wherein the request includes one or more dimensions corresponding to the other view;
receiving a second request to graphically display a movement of changes in the data in time; and
adjusting, while displaying the movement of the changes in the data in time, the multi-dimensional data visualization based on the one or more dimensions corresponding to the other view.

15. The computer-readable device of claim 14, wherein three of the at least four dimensions of the multi-dimensional data visualization comprises three of an X-axis, a Y-axis, a Z-axis, a shape of data points, a color of the data points, a size of the data points, a shading of the data points, a time slider, and a movement of the data points.

* * * * *